United States Patent [19]

Ito et al.

[11] Patent Number: 4,758,618

[45] Date of Patent: * Jul. 19, 1988

[54] CURABLE COMPOSITION OF ELASTOMERIC VINYLIDENE FLUORIDE COPOLYMER

[75] Inventors: Yasumichi Ito, Yokohama; Hiroshi Wachi, Ebina, both of Japan

[73] Assignee: Asahi Glass Company, Ltd., Tokyo, Japan

[*] Notice: The portion of the term of this patent subsequent to Feb. 24, 2004 has been disclaimed.

[21] Appl. No.: 903,129

[22] Filed: Sep. 3, 1986

[30] Foreign Application Priority Data

Oct. 11, 1985 [JP] Japan ................................. 60-224879

[51] Int. Cl.$^4$ ................................................ C08K 3/18
[52] U.S. Cl. .................................... 524/430; 524/433; 524/436; 524/508; 524/545; 524/546; 525/151; 525/326.4; 525/340; 525/351; 525/359.1; 525/359.2; 525/379; 525/380
[58] Field of Search ..................... 525/326.4, 151, 340, 525/351, 359.1, 359.2, 379, 380; 524/430, 433, 436, 508, 545, 546

[56] References Cited

U.S. PATENT DOCUMENTS

| | | | |
|---|---|---|---|
| 3,252,954 | 5/1966 | Calfee et al. | 525/326.4 |
| 3,507,844 | 4/1970 | Wood | 525/326.4 |
| 3,655,727 | 4/1972 | Patel et al. | 525/326.3 |
| 4,645,799 | 2/1987 | Wachi et al. | 525/309 |

FOREIGN PATENT DOCUMENTS 1152208  5/1969  United Kingdom .

*Primary Examiner*—Joseph Schofer
*Assistant Examiner*—Bernard Lipman
*Attorney, Agent, or Firm*—Oblon, Fisher, Spivak, McClelland & Maier

[57] ABSTRACT

A curable composition comprising an elastomeric vinylidene fluoride copolymer, a polyhydroxy compound and a vulcanization accelerator, characterized in that said copolymer contains from 2 to 50 mol % of vinylidene fluoride units and unsaturated bonds introduced by reacting an untreated elastomeric vinylidene fluoride copolymer dispersed in an aqueous medium, with an aqueous alkaline solution containing an onium compound.

13 Claims, No Drawings

CURABLE COMPOSITION OF ELASTOMERIC VINYLIDENE FLUORIDE COPOLYMER

The present invention relates to a curable composition, and more particularly, to an elastomeric fluorine-containing copolymer composition having improved curability.

A combination of a hydroxy compound and a suitable vulcanization accelerator has been known for the curing of elastomeric vinylidene fluoride copolymers (Japanese Examined Patent Publications No. 11138/1976 and No. 38072/1977). This combination is effective for usual copolymers having a high content of vinylidene fluoride particularly with respect to the scorch resistance and the permanent set of the cured products. However, it is inferior in the ability for curing copolymers having a low content of vinylidene fluoride.

It is an object of the present invention to overcome such a problem inherent to the prior art, and to provide a composition which contains an elastomeric copolymer having a low content of vinylidene fluoride, and which has excellent curability and is capable of presenting a vulcanized elastomer having excellent properties.

The present invention provides a curable composition comprising an elastomeric vinylidene fluoride copolymer, a polyhydroxy compound and a vulcanization accelerator, characterized in that said copolymer contains from 2 to 50 mol % of vinylidene fluoride units and unsaturated bonds introduced by reacting an untreated elastomeric vinylidene fluoride copolymer dispersed in an aqueous medium, with an aqueous alkaline solution containing an onium compound.

Now, the present invention will be described in detail with reference to the preferred embodiments.

In the present invention, the untreated elastomeric vinylidene fluoride copolymer may be a copolymer of vinylidene fluoride with at least one comonomer which is capable of forming an elastomeric copolymer when copolymerized with vinylidene fluoride. For instance, there may be mentioned copolymers of vinylidene fluoride with at least one comonomer selected from the group consisting of tetrafluoroethylene, chlorotrifluoroethylene, trifluoroethylene, vinyl fluoride, hexafluoropropylene, a perfluoro(alkylvinyl ether), a perfluoro(alkoxyalkylvinyl ether), ethylene, propylene, isobutylene and the like. More specifically, there may be mentioned a vinylidene fluoride-tetrafluoroethylene-propylene terpolymer, a vinylidene fluoride-tetrafluoroethylene-ethylene-isobutylene four-component copolymer, a vinylidene fluoride-hexafluoropropylene-tetrafluoroethylene terpolymer, a vinylidene fluoride-tetrafluoroethylene-perfluoro (alkylvinyl ether) terpolymer, and a vinylidene fluoride-tetrafluoroethylene-perfluoro(alkoxyalkylvinyl ether) terpolymer, and such copolymers to which other comonomer units are further incorporated. It is preferred to employ a copolymer having a glass transition temperature of not higher than room temperature.

The proportions of the respective monomer units in such copolymers are optionally selected taking into account various properties such as the mechanical properties, heat resistance, low temperature resistance, chemical resistance, oil resistance, etc. For instance, the vinylidene fluoride-tetrafluoroethylene-propylene terpolymer preferably comprises from 2 to 50 mol % of vinylidene fluoride units, from 20 to 60 mol % of tetrafluoroethylene units and from 20 to 50 mol % of propylene units.

Further, in such copolymers, the proportion of the vinylidene fluoride units is preferably from 2 to 50 mol %, more preferably from 10 to 40 mol %. If the proportion is too high, there will be drawbacks with respect to the physical properties, such as a decrease in the alkali resistance or in the amine resistance of the copolymer. On the other hand, if the proportion is too low, the formation of unsaturated bonds will be inadequate, and the effectiveness for the improvement of the curability deteriorates.

In the present invention, it is important that such a copolymer contains unsaturated bonds which have been introduced by reacting an untreated copolymer dispersed in an aqueous solution, with an aqueous alkaline solution containing an onium compound.

The method for dispersing the untreated elastomeric vinylidene fluoride copolymer in an aqueous medium is not critical. However, it is advantageous to employ a method wherein the copolymer is formed in an aqueous medium by means of e.g. emulsion polymerization or suspension polymerization, and the latex or aqueous dispersion thereby obtained is used as it is. Of course, it is also possible to use an aqueous dispersion prepared by dispersing a copolymer prepared by solution polymerization or bulk polymerization, by means of a suitable means. In any case, the average particle size of the copolymer dispersed in the aqueous medium is preferably at most 10 mm in order to conduct the reaction smoothly. Further, the aqueous dispersion may contain t-butanol or an organic solvent such as trichlorotrifluoroethane or dichlorotetrafluoroethane for the purpose of facilitating the reaction.

In the present invention, the onium compound is preferably the one which reacts with a nucleophilic agent and thus serves to promote the solubility in an organic medium by the action of the lipophilic cation, or to improve the affinity to an organic substance, and which has a function to facilitate the reaction of the nucleophilic agent with an organic substrate. For instance, there may be employed an ammonium compound with its cation center element being nitrogen and various other compounds such as a phosphonium compound, an arsonium compound, a sulfonium compound, an oxonium compound, a selenonium compound, a stannonium compound and an iodonium compound. A quaternary ammonium compound and a quaternary phosphonium compound are preferred from the viewpoint of the availability. As such a compound, a chloride, a bromide, an iodide, a hydroxide and a hydrosulfate are preferred. Among them, a compound having a well balanced hydrophilic and lipophilic nature is preferably employed from the viewpoint of the activity. As such a suitable compound, there may be mentioned tetrabutylammonium bromide, tetrabutylammonium chloride, benzyltributylammonium chloride, benzyltriethylammonium bromide, tetrabutylammonium hydrogen sulfate, tetrabutylammonium hydroxide, benzyltriethylammonium chloride, tetrabutylphosphonium bromide and tetrapropylphosphonium bromide. The amount of the onium compound is not critical. However, in order to have the dehydrofluorination reaction conducted smoothly, it is preferred to adjust the amount depending upon the proportion of the vinylidene fluoride units in the copolymer to be treated. When the proportion is represented by V (unit: mol %), the amount (parts by weight) of th onium compound is preferably selected within a range of from 20/V to 400/V, more preferably from 40/V to 200/V per 100 parts by weight of the untreated copolymer i.e. the copolymer to be treated.

In the present invention, as the alkali source of the aqueous alkaline solution containing the onium compound, an amine, ammonia, an alkali metal hydroxide, an alkaline earth metal hydroxide or the like is basically useful. However, from the viewpoints of the workload of the waste water treatment and the coagulating properties of the copolymer, it is preferred to employ sodium hydroxide or potassium hydroxide. The alkali concentration in the aqueous solution is usually from 0.5 to 40% by weight, preferably from 2 to 20% by weight.

In the present invention, it is preferred to take a due care not to cause gelation of the unreacted copolymer when the unreacted elastomeric vinylidene fluoride copolymer is reacted with the aqueous alkaline solution containing the onium compound, in view of the blending properties or curing properties thereby obtainable. Further, from the viewpoints of both the curing properties and the physical properties of the vulcanizate, the concentration of unsaturated bonds in the copolymer treated for the dehydrofluorination, is preferably from 0.1 to 15 per 100 units of the monomer, and this value is preferably at a level of from 0.5 to 10, particularly from 1 to 5. From such viewpoints, the temperature is preferably from 50° to 120° C., more preferably from 70° to 100° C., and the reaction time is preferably from 10 minutes to 10 hours, particularly from 30 minutes to 3 hours.

In the present invention, as the polyhydroxy compound, it is preferred to employ a polyhydroxy aromatic compound such as hydroquinone, bisphenol A, bisphenol AF or salts thereof. Further, a fluorinecontaining fatty acid diol may also be employed. Such a polyhydroxy compound is incorporated usually in an amount of from 0.1 to 20 parts by weight, preferably from 1 to 10 parts by weight, per 100 parts by weight of the elastomeric vinylidene fluoride copolymer.

In the present invention, as the vulcanization accelerator, it is preferred to employ a quaternary ammonium compound such a methyltrioctylammonium chloride, benzyltriethylammonium chloride or tetrahexylammonium tetrafluoroborate; a quaternary immonium compound such as 8-methyl-1,8-diaza-cyclo(5,4,0)-7-undecenium chloride; or a quaternary phosphonium compound such as benzyltriphenylphosphonium chloride, m-trifluoromethylbenzyltrioctylphosphonium chloride or benzyltrioctylphosphonium bromide.

Such a vulcanization accelerator is used usually in an amount of from 0.2 to 10 parts by weight per 100 parts by weight of the elastomeric vinylidene fluoride copolymer.

To the composition of the present invention, there may be incorporated various additives which are commonly used for the preparation of the conventional vulcanized elastomers. These additives include metal oxides such as magnesium oxide and lead oxide; metal hydroxides such as calcium hydroxide; reinforcing fillers such as carbon black, fine silica, clay and talc; other fillers; pigments; antioxidants; and stabilizers.

For the preparation of the composition of the present invention, it is desirable to sufficiently uniformly blend the elastomeric copolymer, the polyhydroxy compound, the vulcanization accelerator and other additives. Such blending is conducted by a conventional means such as a rubber kneading roll or a Bumbury's mixer. The operation for the blending is not critical. Usually, the additives can adequately be dispersed in the elastomeric vinylidene fluoride copolymer by kneading the mixture at a temperature of from 30° to 80° C. for from about 10 to 60 minutes.

It is also possible to add the additives in a form of a suspension by dissolving and dispersing the additives in a suitable medium. It is also possible to employ a wet blending whereby the blending is conducted in a medium from the beginning. In such a case, a composition in the form of a suspension can be prepared by using a mixer such as an open roll, a ball mill or a homogenizer. It is desirable to select the optimum condition and operation for the blending process depending upon the particular purpose and upon the types of the starting materials and the additives.

The composition of the present invention can be fabricated into a shaped product such as a sheet, a pipe, a rod, a tube, an angle, a channel, a coated fabric and a coated board by a continuous fabrication process such as an extrusion, a transfer molding process, a roll-coating process, a brush-coating process or a dipping process. It is also possible to fabricate it into articles having complexed shapes or into special molded products such as sponge rubber by various molding and processing methods. The fabricated composition of the present invention is vulcanized by a suitable vulcanizing means whereby a vulcanized elastomer is obtained from the composition of the present invention.

In the present invention, the vulcanization can be conducted by an operation which has been commonly employed in the conventional vulcanization. For instance, it is possible to employ an operation in which a shaped product is heated under pressure in a mold, or a method in which the composition is molded by extrusion, calender rolling or injection molding, and then the molded product is heated in a heating furnace or in a steamed oven. The conditions for the operation of the vulcanization are selected to be the optimum conditions for the starting materials or the blend composition. The temperature for the vulcanization is usually from 80° to 250° C., preferably from 120° to 200° C. The heating time is not critical, and it is usually selected within a range of from 1 minute to 3 hours, preferably from 5 minutes to 2 hours depending upon the types of the polyhydroxy compound and the vulcanization accelerator. The heating time can be shortened by increasing the heating temperature. Further, it is possible to conduct a post cure treatment of the vulcanizate thereby obtained, which often serves for an improvement of the physical properties. For instance, it is possible to conduct the post cure treatment at a temperature of from 150° to 250° C., preferably from 180° to 230° C., for from 2 to 25 hours.

Now, the present invention will be described in further detail with reference to Examples and Comparative Examples. However, it should be understood that the present invention is by no means restricted to these specific Examples. In the Examples and Comparative Examples, the curing properties of the compositions and the physical properties of the vulcanizates were measured as follows:

Curing properties

By using a Curelastometer (JSR II Model, manufactured by Imanaka Kikai Kogyo K.K.), a vulcanization curve was obtained at 170° C., and the effective torque $\Delta TR$ corresponding to the vulcanization density and the optimum curing time t₉₀ were calculated from the vulcanization curve.

Physical properties of vulcanizates

A curable composition was molded and vulcanized in a shape of a test piece having a thickness of 2 mm and the one for the measurement of permanent set, under a pressure of 100 kg/cm2G at a temperature of 190° C. for 20 minutes, and then subjected to second curing at 230° C. for 24 hours to obtain a test piece, which was subjected to the measurement of various physical properties.

The tensile properties, low temperature resistance and chemical resistance were measured in accordance with JIS K-6301, and the permanent set was measured in accordance with ASTM D-395-78.

EXAMPLE 1

A latex containing 13.1% by weight of a terpolymer comprising vinylidene fluoride/tetrafluoroethylene/propylene in the molar ratio of 34.8/38.9/26.3 was prepared by emulsion polymerization.

On the other hand, into a 2 liter three-necked flask equipped with a condenser and a stirrer, 500 g of an aqueous solution containing 10% by weight of sodium hydroxide was charged and heated to 90° C. To this solution, 380 g of the latex obtained above was dropwise added under stirring, and the resulting copolymer was permitted to coagulate to obtain a dispersion of the copolymer. The dropping rate and the stirring rate were controlled to adjust the particle size of the coagulated particles to be at most 10 mm.

Then, 1.5 g of tetra-n-butylammonium bromide was added to the above dispersion, and the mixture was maintained at 90° C. for 3 hours. As the time passes, both the particle phase and the liquid phase colored brown. After cooling the dispersion to room temperature, the particle phase was separated, washed and dried, whereby 49.6 g of the treated copolymer was obtained.

By the treatment, new absorption peaks were observed at 3130 cm$^{-1}$, at 1722 cm$^{-1}$ and at 1690 cm$^{-1}$ in the infrared spectrum, and thus the introduction of unsaturated bonds was confirmed.

40 g of the treated copolymer obtained above, 0.8 g of benzyltriphenylphosphonium chloride, 2 g of bisphenol AF, 2.4 g of calcium hydroxide and 10 g of MT carbon were kneaded by a 4 inch roll mill to obtain a curable composition. The curing properties of the curable composition and the physical properties of the vulcanizate are shown in Table 1.

COMPARATIVE EXAMPLE 1

380 g of the same latex as in Example 1 was dropwise added to an aqueous sodium chloride solution, followed by coagulation, washing and drying, whereby 49.8 g of a white polymer was obtained.

The copolymer thus obtained was directly blended and kneaded in the same manner as in Example 1 to obtain a curable composition.

The curing properties of such a composition were as poor as ΔTR being only 1.4 kg-cm and t₉₀ being as long as 11.7 minutes, thus not suitable for practical application.

COMPARATIVE EXAMPLE 3

A latex containing 13.1% by weight of a four component copolymer comprising vinylidene fluoride/tetrafluoroethylene/propylene/perfluoro-(2-bromoethylvinyl ether) in a molar ratio of 40.1/34.8/23.2/1.9 and having a composition similar to the one used in Example 1 except that a small amount of perfluoro-(2-bromoethyl vinyl ether) units are contained as curing sites, was prepared by emulsion polymerization.

The intrinsic viscosity of the four component copolymer separated from the above latex was 0.63 dl/g as measured in tetrahydrofuran.

This copolymer was directly blended and kneaded in the same manner as in Example 1 to obtain a curable composition. The curing properties of the composition and the physical properties of the vulcanizate are shown in Table 1.

EXAMPLE 2

The same treatment and operation as in Example 1 were conducted except that a terpolymer comprising vinylidene fluoride/tetrafluoroethylene/propylene in a molar ratio of 25.9/39.8/34.4 was used as the elastomeric vinylidene fluoride copolymer, whereby a curable composition was obtained.

The curing properties and the physical properties of the vulcanizate are shown in Table 1.

EXAMPLE 3

The same operation as in Example 1 was conducted except that benzyltriethylammonium chloride was used instead of the benzyltriphenylphosphonium bromide as the vulcanization accelerator, whereby a curable composition was obtained.

The curing properties and the physical properties of the vulcanizate are shown in Table 1.

TABLE 1

|  | Example 1 | Example 2 | Example 3 | Comparative Example 1 |
|---|---|---|---|---|
| Curing properties |  |  |  |  |
| Effective torque ΔTR (kg-cm) | 4.6 | 4.8 | 4.2 | 1.4 |
| Optimum curing time t₉₀ (min) | 9.0 | 9.2 | 8.9 | 11.7 |
| Physical properties |  |  |  |  |
| Tensile breaking strength (kg/cm$^2$) | 164 | 181 | 171 | 154 |
| Breaking elongation (%) | 153 | 162 | 182 | 364 |
| 100% Modulus | 82 | 83 | 75 | 37 |
| Hardness (JIS A) | 79 | 79 | 78 | 72 |
| Permanent set (%) | 29 | 28 | 29 | 46 |

*Permanent set: 25% Compression, 200° C. × 70 hrs

EXAMPLE 4

The same operation as in Example 1 was conducted except that tetra-n-butylphosphonium bromide was used instead of the tetra-n-butylammonium bromide as the onium compound for the reaction of the aqueous alkaline solution containing an onium compound, whereby a curable composition was obtained.

The curing properties of the composition were substantially the same as those in Example 1 with ΔTR being 4.2 kg-cm, and t₉₀ being 9.3 minutes, and the physical properties of the vulcanizate were substantially the same as those in Example 1.

The compositions of the present invention have remarkably improved curability and thus are useful as a starting material for vulcanized elastomers having excellent physical properties, and they also have industrial advantages that they can be produced by a simple process in good reproducibility.

Further, by virtue of various excellent physical properties of the vulcanizates, they are useful for a wide range of applications to e.g. automobile parts such as radiators or engine parts including O-rings, gaskets, sealing materials or tubes, food plant machinery such as heat exchanger gaskets or diaphragms, chemical plant machinery such as gaskets, sealing materials or hoses, or other sealing materials for automatic vending machines.

We claim:

1. A curable composition comprising an elastomeric vinylidene fluoride copolymer, a polyhydroxy compound selected from the group consisting of polyhydroxy aromatic compounds and fluorine-containing fatty acids diols and a vulcanization accelerator selected from the group consisting of quaternary ammonium compounds, quaternary immonium compounds and quaternary phosphonium compounds, said copolymer containing from 2 to 50 mol % of vinylidene fluoride units and containing unsaturated bonds in an amount ranging from 0.1 to 15, per 100 monomer units in the copolymer, said unsaturated bonds introduced into said copolymer by reacting an untreated elastomeric vinylidene fluoride copolymer dispersed in an aqueous solution with an aqueous alkaline solution containing an onium compound.

2. The composition according to claim 1, wherein the average particle size of the copolymer dispersed in the aqueous medium is at most 10 mm.

3. The composition according to claim 1, wherein the amount of the onium compound is at most 30 parts by weight per 100 parts by weight of the copolymer.

4. The composition according to claim 1, wherein the onium compound is at least one member selected from the group consisting of quaternary ammonium salts and quaternary phosphonium salts.

5. The composition according to claim 1, wherein the reaction temperature of the aqueous alkaline solution is from 50° to 100° C.

6. The composition of claim 1, wherein said onium compound is tetrabutylammonium bromide, tetrabutylammonium chloride, benzyltributylammonium chloride, benzyltriethylammonium bromide, tetrabutylammonium hydrogen sulfate, tetrabutylammonium hydroxide, benzyltriethylammonium chloride, tetrabutylphosphonium bromide or tetrapropylphosphonium bromide.

7. The composition according to claim 1, wherein said vinylidene fluoride copolymer is a member selected from the group consisting of vinylidene fluoride-tetrafluoroethylene-propylene terpolymer, vinylidene fluoride-tetrafluoroethylene-ethylene-isobutylene copolymer, vinylidene fluoride-hexafluoropropylene-tetrafluoroethylene terpolymer, vinylidene fluoride-tetrafluoroethylene-perfluoro (alkylvinylether), and vinylidene fluoride-tetrafluoroethylene-perfluor(alkoxyalkylvinylether) terpolymer.

8. The composition according to claim 1, wherein said copolymer contains from 10 to 40 mol % of vinylidene fluoride units.

9. The composition according to claim 1, wherein the amount of said unsaturated bonds ranges from 0.5 to 10 per 100 units of monomer in said copolymer.

10. The composition according to claim 1, wherein the amount of said vulcanization accelerator ranges from 0.2 to 10 parts by weight per 100 parts by weight of said vinylidene fluoride copolymer.

11. The composition according to claim 1, wherein said vulcanization accelerator is a member selected from the group consisting of methyltrioctylammonium chloride, benzyltriethylammonium chloride, tetrahexylammonium tetrafluoroborate, 8-methyl-1,8-diazacyclo(5,4,0)-7-undecenium chloride, benzyltriphenylphosphonium chloride, m-trifluoromethylbenzyltrioctylphosphonium chloride and benzyltrioctylphosphonium bromide.

12. The composition according to claim 1, wherein the amount of said polyhydroxy compound ranges from 0.1 to 20 parts by weight per 100 parts by weight of said vinylidene fluoride copolymer.

13. The composition according to claim 1, which further comprises at least one additive selected from the group consisting of metal oxides, metal hydroxides, a filler, a pigment, an antioxidant and a stabilizer.

* * * * *